United States Patent [19]
Zenker et al.

[11] 4,106,364
[45] Aug. 15, 1978

[54] VARIABLE GEAR TRANSMISSION

[75] Inventors: Walter Zenker, Bensberg-Refrath; Karl-Heinz Hülsebusch, Cologne, both of Fed. Rep. of Germany

[73] Assignee: Klockner-Humboldt-Deutz Aktiengesellschaft, Cologne, Fed. Rep. of Germany

[21] Appl. No.: 673,372

[22] Filed: Apr. 5, 1976

[30] Foreign Application Priority Data

Apr. 4, 1975 [DE] Fed. Rep. of Germany ....... 2514781

[51] Int. Cl.² ............................................ F16H 37/02
[52] U.S. Cl. ...................................... 74/740; 74/331; 74/360
[58] Field of Search ................ 74/331, 357, 359, 360, 74/740, 745

[56] References Cited

U.S. PATENT DOCUMENTS

| | | | |
|---|---|---|---|
| 864,824 | 9/1907 | Barnes | 74/359 |
| 3,050,164 | 8/1962 | Bowen et al. | 74/359 |

FOREIGN PATENT DOCUMENTS

| | | | |
|---|---|---|---|
| 2,346,116 | 3/1975 | Fed. Rep. of Germany | 74/74 |

*Primary Examiner*—Stephen C. Bentley
*Attorney, Agent, or Firm*—Walter Becker

[57] ABSTRACT

A change gear transmission of the group design, especially for vehicles for agriculture and construction with a group transmission following a velocity control transmission the output shaft of which is arranged parallel to a main shaft. This main shaft is provided with gears connected to the main shaft for rotation therewith. The main shaft is driven through the intervention of a counter shaft of the velocity control transmission, which counter shaft is parallel to the main shaft. The counter shaft is through an input transmission continuously frictionally connected to the input shaft which latter is adapted by a clutch element in a direct velocity stage to be coupled to said main shaft. All gears of the main shaft mesh directly or indirectly with gears freely rotatable on said counter shaft and output shaft respectively. Each pair of these freely rotatable gears have associated therewith a common double control member which is axially displaceable on and connected to the output shaft and counter shaft respectively. One of the gears connected to the main shaft for rotation therewith meshes with a reversing transmission which latter includes a gear that meshes with one of the gears which are freely rotatable on and can selectively be coupled to said output shaft.

5 Claims, 3 Drawing Figures

VARIABLE GEAR TRANSMISSION

The present invention relates to a gear change transmission of the group type, especially for land vehicles and vehicles employed in the construction field, with a group transmission following a speed control transmission and having its output shaft extending parallel to a main shaft common to the group transmission and the speed control transmission. Said main shaft has fixedly connected thereto gears which are driven through the intervention of a counter shaft of the speed control transmission which countershaft is parallel to the main shaft. The said counter shaft is through the intervention of an input back gearing (Eingangsvorgelege) frictionally connected to the input shaft while the latter is adapted through the intervention of a clutch element to be connected in a direct velocity stage to the main shaft.

With change gear transmissions of the above mentioned type, when synchronizing the speed control transmission, there exists the problem to provide the control elements of said speed control transmission, for reasons of cost, with as compact synchronizing elements as possible. Furthermore, when equipping the entire change gear transmission with shift forks which are equal at least as far as their shift keys (Schaltschlüssel) are concerned, there exists the problem of being able so to dimension the annular groove of the double shift elements provided with synchronizing elements (said annular groove being associated with the shift keys of the shift forks) that this dimensioning of the annular groove corresponds to the annular groove of the shift elements of the group transmission which shift elements are provided with synchronizing elements and as to their torque are under a higher load. With gear change transmissions of the above mentioned type, when employing the same in vehicles for loading operations, there exists the problem in the group transmission with a forward control stage for fast soil working operations to associate a rearward control stage which has to its velocity range is only slightly higher than said forward control stage, said two control stages being arranged opposite to each other.

Starting from this finding, it is an object of the present invention so to improve and design a gear change transmission of the above mentioned general type, that while employing shift forks which equal each other at least as to their shift key, with a minimum of gears in the group transmission to form a rearward control stage which with regard to its velocity range is higher than a fast soil working stage and as to its control stroke is located opposite said rearward control stage.

These and other objects and advantages of the invention will appear more clearly from the following specification in connection with the accompanying drawings, in which:

FIG. 1 diagrammatically illustrates a change gear transmission according to the invention with a selectively built-on crawl back gear system in the group transmission.

Figure 1:
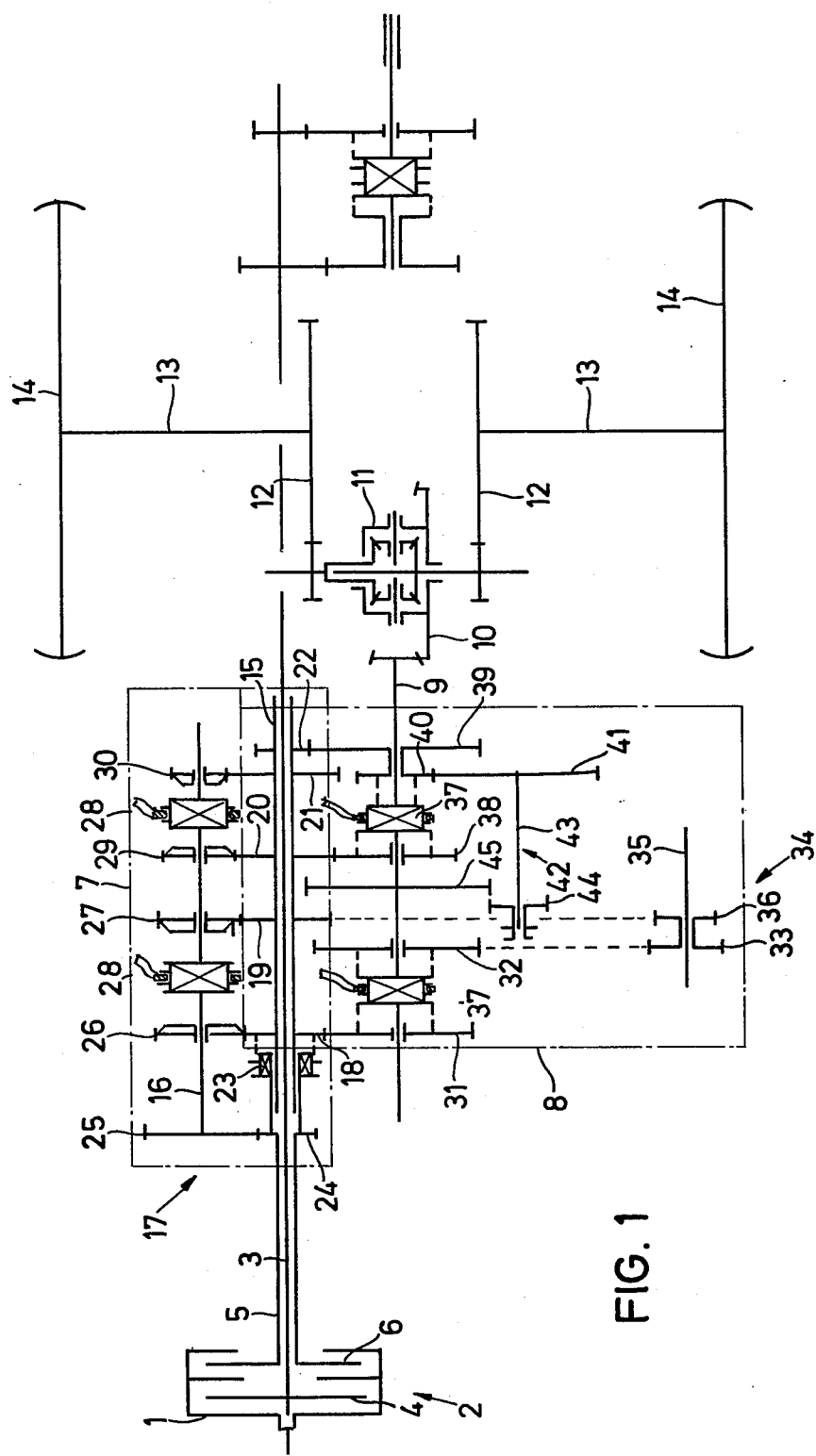

The gear change transmission according to the invention is characterized primarily in that all gears of the main shaft directly or indirectly mesh with gears which are freely rotatable on the counter shaft or output shaft, and is furthermore characterized in that each of these freely rotatable gears has associated therewith a pair of common double shift members one of which is non-rotatably connected to the output or counter shaft and the other one is axially displaceable on the output or counter shaft. The change gear transmission according to the invention is furthermore characterized in that one of the gears which is fixedly connected to the gears of the main shaft meshes with a reversing transmission which includes a gear that meshes with one of the gears which is freely rotatable and selectively connectably mounted on the output shaft. Such a solution has in particular the advantage that the control elements arranged on the counter shaft of the speed control transmission can be provided with compact synchronizing elements. The control members can in view of the prevailing small synchronizing moment be provided with an annular groove for associated shifting forks which annular groove corresponds to the annular groove of non-synchronized control members arranged on the output shaft. The rearward control stage of the group transmission may likewise be arranged opposite a forward control stage serving for fast soil working operations and low transport operations so that the rearward control stage is as to its velocity range located slightly above the velocity range adapted to be formed in this forward control stage.

According to a further development of the invention, for purposes of a dual use of structural elements of a speed control transmission, it is provided that the gear which is non-rotatably connected to the main shaft and serves for driving the reversing transmission forms in connection with the associated freely rotatable gear of the counter shaft the penultimate stepped-up upper velocity stage of the velocity control transmission. A further dual use of structural elements of the speed control transmission is realized by the fact that the gear which is non-rotatably connected to the main shaft and forms a part of the fastest speed stage of the speed control transmission, in cooperation with the associated gear which is freely rotatable on the output shaft forms a part of the second fastest forward control stage of the group transmission. In this connection, a particularly favorable solution in a control technical sense is obtained for a fast, and in the control stroke, direct shift-over between the rearward velocity stages and the associated oppositely located slower forward stages. This is due to the fact that in addition to the freely rotatable gear of the output shaft which gear forms a part of the second fastest control stage of the group transmission there is provided a freely rotatable gear that is adapted selectively to be coupled to said output shaft. The last mentioned gear meshes with the reversing transmission while the gear driven by the reversing transmission and the adjacent gear forming a part of the second control stage of the group transmission has a common double control member associated therewith.

For purposes of providing a particularly low-cost and selectively applicable forward control stage in the group transmission for crawl operation in combination with the principle of the invention, it is provided that a gear which forms a part of a low control stage of the group transmission and which is freely rotatable and is selectively connectable to the output shaft, is connected to a gear adapted selectively to be coupled directly by means of a double control element to the output shaft and meshes with a crawl speed transmission which comprises a slidable gear adapted to be brought into meshing engagement with a gear non-rotatably connected to the output shaft of the group transmission. In this way, a favorable manufacturing possibility is obtained due to the fact that the gear which is fixedly connected to the output shaft and is selectively driven through the intervention of the crawl transmission meshes with a multi-stage transmission which serves for driving the stroke dependent auxiliary drive. A further dual use of structural elements is realized by the fact that the gear of the transmission of the auxiliary drive which gear is driven by the gear fixedly connected to the output shaft, is journalled on the axle of the reversing transmission.

Referring now to the drawings in detail, the transmission system shown in FIG. 1 comprises a flywheel 1 of a non-illustrated driving engine which flywheel is connected to a double friction clutch 2. In addition to a follower 4 nonrotatably connected to an auxiliary drive shaft 3, the double friction clutch 2 comprises a follower 6 which is non-rotatably connected to an input shaft 5 of the change gear transmission, which input shaft 5 is designed as hollow shaft. In addition to a speed control transmission 7 driven by the input shaft 5, the change gear transmission comprises a group transmission 8 which follows said speed control transmission 7. The group transmission 8 has an output shaft 9 by means of which a differential 11 can be driven through the intervention of a bevel gear transmission 10. By means of the differential 11, one back gear 12 each is adapted to be driven by an associated axle drive shaft 13 with a driving gear 14.

The speed control transmission 7 in addition to comprising the input shaft 5 also comprises a main shaft 15 coaxially mounted with said input shaft 5 and also comprises a counter shaft 16 parallelly arranged to said main shaft 15 and furthermore comprises an input transmission 17. The main shaft 15 simultaneously forms a component of the group transmission 8 and has fixedly connected thereto gears 18, 19, 20, 21 and 22. Non-rotatably connected to the input shaft 5 and axially displaceable thereon is a control member 23 by means of which in a velocity stage, the input shaft 5 is adapted to be connected to the main shaft 15. The input transmission 17 which is driven by the input shaft 5 comprises a gear 24 which is non-rotatably mounted on said input shaft 5 and furthermore comprises a gear 25 which is mounted on the transmission shaft 16 and meshes with said gear 24. Furthermore, a gear 26 meshing with gear 18 and forming therewith the velocity stage IV is freely rotatably and selectively connectably mounted on the counter shaft 16. In the velocity control transmission 7, the velocity stage III is formed by the gear 19 in cooperation with a gear 27 which is freely rotatably journalled on the counter shaft 16 and is adapted selectively to be coupled to the latter. For purposes of shifting the two velocity stages III and IV, between the two gears 26 and 27, there is provided a double control member 28 with synchronizing elements, which double control member is designed as double control sleeve with synchronizing elements and is non-rotatably but axially displaceably arranged on the counter shaft 16. The velocity stage II of velocity control transmission 7 is formed by the gear 20 with a gear 29 which is freely rotatably mounted on the counter shaft 16 and is adapted selectively to be connected thereto. The velocity stage I provided in the velocity control transmission is formed by the gear 21 in cooperation with a gear 30 which meshes with gear 21 and is freely rotatable on counter shaft 16. For purposes of controlling the two velocity stages I and II, there is between the two gears 29 and 30 arranged a double control member 28 with synchronizing elements which is designed for instance as double control sleeve and which is non-rotatably but axially displaceably connected to the counter shaft 16.

The group transmission 8 includes a gear 31 which is freely rotatable on the output shaft 9 and is adapted selectively to be connected thereto. Gear 31 meshes with the gear 18 and together with the latter forms a control stage Z provided for the fast soil working operations and for the low transport operation. Furthermore, there is provided a gear 32 which is freely rotatable on output shaft 9 and is adapted to be connected thereto. Gear 32 meshes with gear 33 of a reversing transmission 34 which is mounted on an auxiliary shaft 35. The reversing transmission 34 furthermore comprises a gear 36 which is non-rotatably connected to the gear 33, said gear 36 meshing with gear 19. The gears 19, 32 form in cooperation with the reversing transmission 34 the rearward control stage R of the group transmission 8. The velocity range adapted to be controlled by the rearward control stage R should be between 6.5 and 21 kilometers per hour, whereas the velocity range pre-selectable by the control stage Z is about between 5.5 and 18 kilometers per hour. In this way, it will be assured for the required fast loading operation, that immediate shifting over from control stage Z to control state R which is somewhat higher than the control stage Z, can be carried out. For purposes of shifting the two control stages Z and R which in the control train are located opposite to each other, a double control jaw 37 is non-rotatably but axially displaceably arranged on output shaft 9 between the two gears 31 and 32. The annular groove of double control jaw 37 which is associated with a non-illustrated shaft fork should as far as the dimensions thereof are concerned correspond to the annular groove of the double control member 28 provided with synchronizing elements. In this way, according to the invention, it will be assured that at least for the control members 28 and 37 shift forks with the same gauge can be employed even with a corresponding mounting of the control rods even with identical shift forks for the control members 28 and 34. Furthermore, the shift fork associated with the control member 23 should at least as far as its shift gage is concerned, correspond to the shift gage of the control forks for the control elements of the double control elements 28 and 37. Furthermore, a gear 38 is freely rotatably mounted on the output shaft 9 and is adapted selectively to be connected thereto. Gear 38 meshes with gear 20 and forms together with the latter the control stage S of the group transmission 8 in a range of from about 9.5 to 30 kilometers per hour. This control stage S is provided for fast transport operations. The control stage L of the group transmission 8 which is provided for slow ground working operations within the range of from 2.4 to 7.5 kilometers per hour is formed by the gear 22 in cooperation with a gear 39 which is freely rotatable on output shaft 9 and is adapted selectively to be connected thereto. The gear 39 is non-rotatably connected to an adjacent gear 40 which meshes with a gear 41 of a crawl velocity transmission 42. The transmission 42 furthermore comprises an auxiliary shaft 43 which is non-rotatably connected to the gear 41 and also comprises a sliding gear 44 which is non-rotatably connected to shaft 43. The gear 44 has associated therewith a gear 45 which is non-rotatably connected to the output shaft 9. For shifting the two control stages L and S, between the two gears 38 and 40, there is non-rotatably but axially displaceably provided a double jaw 37 so that also in this connection the same shift fork may be employed as used with the double control element 28 arranged between the two gears 29 and 30 located opposite to each other. On the other hand, however, the crawl stage K of the group transmission 8 is within its range of from about 0.5 to 1.7 kilometers per hour controlled or shifted by engaging and disengaging the slidable gear 44 with and from the associated gear 45.

Figure 3:
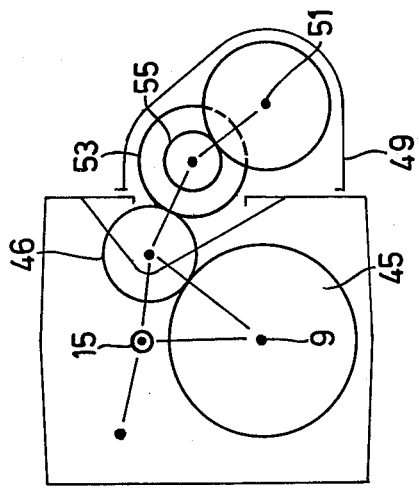
FIG. 3 illustrates a cross section through the gear change transmission according to the invention, said section being taken along the line III—III of FIG. 2.
Figure 2:
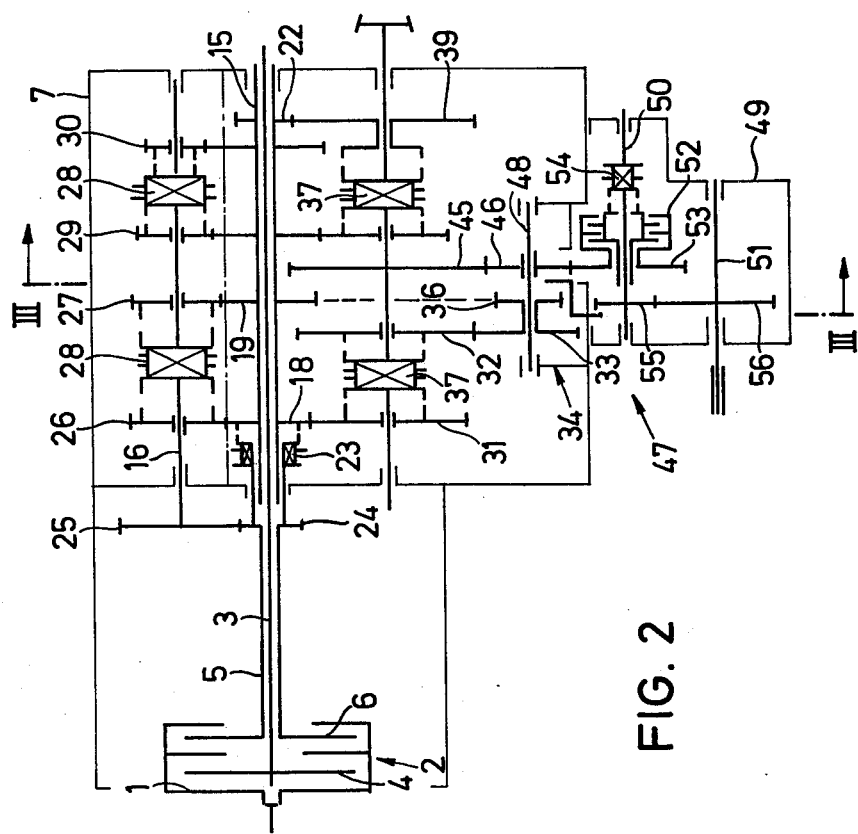
FIG. 2 illustrates another embodiment of the invention with a selectively built-on auxiliary drive which serves as front axle drive and is dependent on the drive.

With the embodiment illustrated in FIGS. 2 and 3, in counter distinction to the embodiment of FIG. 1, a gear 46 of a drive dependent auxiliary drive 47 is driven by gear 45. Gear 46 is journalled on an auxiliary shaft 48 which preferably simultaneously serves for mounting the reversing transmission 34. Housing 49 of the auxiliary drive 47 is flanged onto the housing of the change gear transmission which is not illustrated in detail. Housing 49 serves as mounting for an intermediate shaft 50 and an output shaft 51. Mounted on the intermediate shaft 51 is a slip clutch 52 with a driving gear 53 non-rotatably connected to shaft 51. Gear 53 meshes with gear 46. The slip clutch 52 is selectively by means of a shifting jaw 54 coupled to the intermediate shaft 50. Furthermore, the intermediate shaft 50 comprises a gear 55 non-rotatably connected thereto. Gear 55 meshes with gear 56 which is non-rotatably connected to the output shaft 51 for a non-illustrated front wheel drive.

It may be mentioned that with the embodiment of FIGS. 2 and 3, correspondingly also a crawl transmission 42 may be used in which instance, however, the gear 39 would have to be connected with the gear 40 similar to FIG. 1.

It is, of course, to be understood that the present invention is, by no means, limited to the specific showing in the drawings, but also comprises any modifications within the scope of the appended claims.

What is claimed is:

1. A gear change transmission of the group type, especially for motor vehicles for agriculture and construction work, which includes in combination: an input shaft, a speed control transmission drivingly connected to said input shaft, a group transmission drivingly connected to and following said speed control transmission, a main shaft common to said group trnsmission and said speed control transmission, said group transmission having an output shaft journalled parallel to said main shaft, said main shaft being coaxially mounted with said input shaft, a first group of gears connected to said main shaft for rotation therewith, a counter shaft forming part of said speed control transmission and being arranged parallel to said main shaft for driving the gears of said first group of gears, inlet transmission means drivingly connecting said counter shaft to said input shaft, clutch means operable to drivingly connect said input shaft to said main shaft, a second group of gears freely rotatably mounted on said counter shaft and comprising a first and second pair of gears, a third group of gears freely rotatably mounted on said output shaft and comprising a third and fourth pair of gears, all gears of said first group of gears being drivingly connected to said second and third group of gears, first and second double shift means axially displaceable on and connected to said counter shaft for rotation in common therewith and respectively operatively associated with said first and second pair of gears of said second group of gears, third and fourth double shift means axially displaceable on and connected to said output shaft and respectively operatively associated with said third and fourth pairs of gears of said third group of gears, and a reversing transmission including a gear meshing with one of the gears of said third group of gears, said first and second double shift means being provided with synchronizing elements, and said third and fourth double shift means and said first and second double shift means having like annular grooves for shift forks of the same wrench width.

2. A transmission in combination according to claim 1, in which one of the gears of said first group of gears is drivingly connected to said reversing transmission and together with a gear drivingly associated with said reversing transmission and freely rotatable on said counter shaft forms a part of the penultimate stepped-up upper velocity stage of said speed control transmission.

3. A transmission in combination according to claim 1, in which one gear of said first group of gears forming part of the fastest velocity stage of said speed control transmission in cooperation with a drivingly associated gear freely rotatable on said output shaft forms a part of the second fastest forward velocity stage.

4. A transmission in combination according to claim 3, in which said group transmission includes a gear meshing with said reversing transmission and arranged adjacent said gear which forms part of said second fastest velocity stage of said group transmission and is freely rotatable on said output shaft and is adapted to be coupled to said output shaft, said first mentioned gear meshing with said reversing transmission being adapted to be coupled to said output shaft.

5. A transmission in combination according to claim 1, which includes a gear freely rotatable on and adapted to be coupled to said output shaft and forming a part of a low velocity stage of said group transmission, a gear connected to said first mentioned gear arranged on said output shaft and adapted selectively by means of said fourth double shift means to be coupled to said output shaft, a crawl speed transmission meshing with said last mentioned gear and comprising a slidable gear, and an additional gear connected to said output shaft of said group transmission for rotation with said output shaft, said slidable gear being adapted selectively to be brought into mesh with said additional gear.

* * * * *